US010657489B2

(12) United States Patent
Jones et al.

(10) Patent No.: US 10,657,489 B2
(45) Date of Patent: May 19, 2020

(54) OVERSTOCK INVENTORY MANAGEMENT SYSTEM

(71) Applicant: Walmart Apollo, LLC, Bentonville, AR (US)

(72) Inventors: Nicholaus Adam Jones, Fayetteville, AR (US); Marc Ashley Fletter, Bentonville, AR (US); Matthew Allen Jones, Bentonville, AR (US); Daniel R. Shields, Rogers, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 685 days.

(21) Appl. No.: 15/096,731

(22) Filed: Apr. 12, 2016

(65) Prior Publication Data

US 2016/0307149 A1 Oct. 20, 2016

Related U.S. Application Data

(60) Provisional application No. 62/147,255, filed on Apr. 14, 2015.

(51) Int. Cl.
*G06Q 10/08* (2012.01)
*G06Q 10/04* (2012.01)

(52) U.S. Cl.
CPC .................. *G06Q 10/087* (2013.01)

(58) Field of Classification Search
USPC ............................ 705/28; 340/540; 235/383
See application file for complete search history.

(56) References Cited

U.S. PATENT DOCUMENTS

| 7,669,763 | B2 | 3/2010 | Ernesti | |
|---|---|---|---|---|
| 7,693,757 | B2 | 4/2010 | Zimmerman | |
| 8,325,036 | B1* | 12/2012 | Fuhr | G06Q 10/087 340/5.92 |
| 2003/0154141 | A1* | 8/2003 | Capazario | G06Q 10/087 705/26.1 |
| 2007/0214065 | A1* | 9/2007 | Kahlon | G06Q 10/087 705/28 |

(Continued)

OTHER PUBLICATIONS

IBM Sterling Store Inventory Management Concepts Guise Release 9.2, 2006 (30 pgs.).

*Primary Examiner* — Fahd A Obeid
*Assistant Examiner* — Reva R Moore
(74) *Attorney, Agent, or Firm* — Fitch, Even, Tabin & Flannery, LLP (57) ABSTRACT

In some embodiments, methods and systems of managing overstock products at a retail sales facility include scanning a product at a stock room location of the retail sales facility using a hand-held electronic device including a processor. At least two of three functions are performed based on the scanning. First, the product may be audited by comparing data obtained by scanning the product to data contained in an inventory management database. Second, a determination of whether the scanned item is on a pick list may be made, which may include determining a demand for the scanned product to arrive at a decision whether to store the product in the stock room or place it on a shelf on the sales floor. Third, if the item is to be stored in the stock room, a determination of whether identical items are stored in bins in the stock room may be made.

14 Claims, 4 Drawing Sheets

(56) References Cited

U.S. PATENT DOCUMENTS

| | | | |
|---|---|---|---|
| 2008/0183599 A1* | 7/2008 | Hill | G06Q 10/087 705/28 |
| 2014/0006229 A1 | 1/2014 | Birch | |
| 2014/0201041 A1 | 7/2014 | Meyer | |
| 2014/0247116 A1* | 9/2014 | Davidson | G06Q 10/087 340/10.1 |
| 2015/0178671 A1* | 6/2015 | Jones | G06Q 10/087 705/28 |
| 2016/0055357 A1* | 2/2016 | Hicks | G06K 7/10881 235/383 |

* cited by examiner

OVERSTOCK INVENTORY MANAGEMENT SYSTEM

RELATED APPLICATIONS

This application claims the benefit of U.S. Provisional Application No. 62/147,255, filed Apr. 14, 2015, which is incorporated herein by reference in its entirety.

TECHNICAL FIELD

This invention relates generally to managing inventory at retail locations and, in particular, to systems and methods for sorting overstock items at retail locations.

BACKGROUND

Retail locations typically employ multiple inventory management associates that perform different tasks related to inventory management and stocking. One associate may unload/remove items from a truck that delivers the items and place the unloaded items into stocking carts. Another associate may be responsible for taking the stocking cart to the sales floor and placing the items onto the shelves on the sales floor. Yet another associate may be responsible for taking the items remaining on the stocking cart and sorting the "overstock" items into one or more storage bins in the stock room. Still another associate may be responsible for determining whether there is a need for more items on the shelves on the sales floor and retrieving the "overstock" items from the stock room and delivering the items from the stock room to the display shelf on the sales floor.

One disadvantage of using several inventory management associates to independently perform separate stocking tasks as described above is decreased inventory management efficiency. For example, the associate binning the "overstock" items in the stock room typically does not go onto the sales floor to check available space for the item on a shelf on the sales floor, and thus does not know if the items being binned in the stock room can be instead displayed on the shelf on the sales floor. This may lead to undesired situations where the shelves on the sales floor are not fully stocked with items while a number of such items that could be displayed on the shelves and displayed to the consumers are stored in bins in the stock room.

Another disadvantage of known inventory management systems is that the associate binning an "overstock" item in the stock room typically does not know that identical items are already stored in bins in the stock room. This may lead to an undesired situation, where identical items are stored in different locations in the stock room, leading to inefficiency in retrieving such items, since an inventory management associate is often forced to search for multiple identical items in different bins located in separate locations of the stock room.

BRIEF DESCRIPTION OF THE DRAWINGS

Disclosed herein are embodiments of systems, apparatuses and methods pertaining to methods and systems for managing overstock inventory. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, the present application describes systems and methods for managing overstock product inventory at retail sales facilities. In some embodiments, systems and methods described herein can determine whether an "overstock" item, which may be located on a stocking cart anywhere at a retail sales facility, in a sorting area of a stock room of the retail sales facility, in a product unloading area of the retail sales facility, or any other location where "overstock" products (e.g., overstock from the sales floor, product returns, or new shipments received from deliveries) may be temporarily stored prior to being sorted for placement into storage bins in the stock room or onto shelves on the sales floor, that is scanned by an inventory management or stocking associate can fit on a shelf on the sales floor of the retail sales facility, and alerts a stock room inventory management associate (or a sales floor associate, or a returns cashier, or the like) to "pick" the item from the stocking bin (or from a suitable location on the sales floor, or from a returns bin) and place the item on a "to-be-stocked" cart for delivery to a shelf on the sales floor instead of stocking the item in a storage bin in a stock room of the retail sales facility. If space on a shelf on the sales floor is not available for the scanned item, the system can determine whether the scanned item is to be placed into a storage bin in a stock room or another bin (e.g., promotion bin or future display bin), and if the system determines that the scanned item is to be placed into a storage bin in a stock room, the system can determine which storage bin in the stock room stores identical items such that the stocking associate can place the scanned item into a storage bin in the stock room that contains identical items for efficient future retrieval of such items from one bin instead of having to look for the items in multiple bins.

Figure 1:
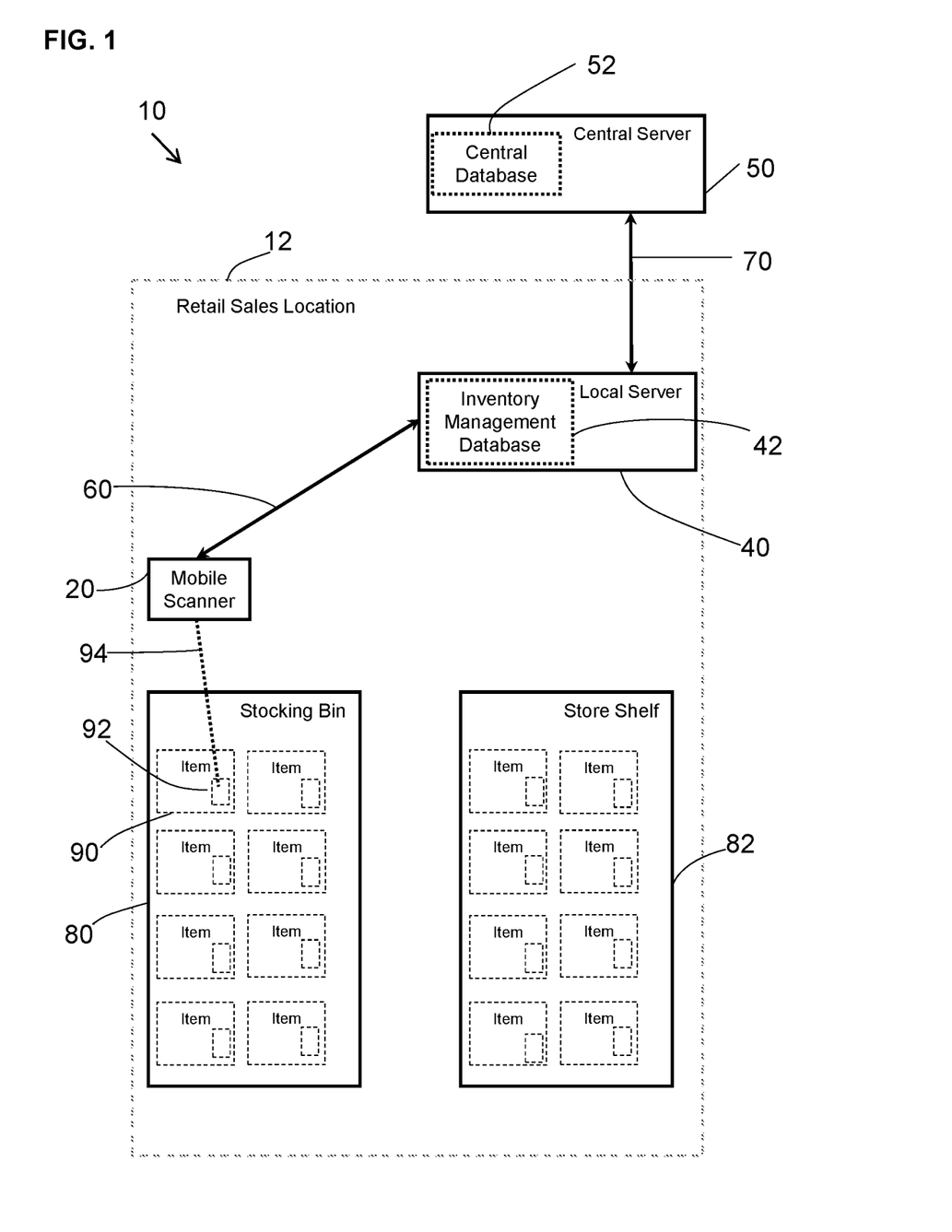
FIG. 1 is a diagram of a retail sales facility product management system in accordance with some embodiments.

Referring to FIG. 1, one embodiment of a system 10 for evaluating and managing an inventory of consumer products at a physical retail location or retail sales facility 12 is shown. The retail sales facility may be any place of business such as a store or warehouse where consumer products are stocked and/or sold. The exemplary system 10 includes a mobile scanning device or scanner 20 configured to scan items 90 located in stocking bins 80 at the retail sales facility 12.

The illustrated system 10 also includes a local (on-site) server 40 in two-way communication with the mobile scanning device 20 via a connection 60, and a remote (central) server 50 in two-way communication with the local server 40 via a connection 70. The connections 60 and 70 may be wired or wireless connections. It will be appreciated that optionally, the mobile scanning device 20 may be in two-way communication with the central server 50 over a wireless connection. It will also be appreciated that the local server 40 and the central server 50 do not have to communicate to each other directly, but may communicate to each other via an intermediate server or other device.

The mobile scanning device or scanner 20 may be a hand-held retail scanner or another hand-held electronic device, for example, a mobile phone, that is configured to scan retail items. The mobile scanner 20 may have a control unit 22 including a processor (for example, a microprocessor or a microcontroller) electrically coupled via a connection 23 to a memory 24 and via a connection 25 to a power supply 26. The control unit 22 may be incorporated into a physical structure of the hand-held mobile scanner 20 or may be located at the local server 40, central server 50, or any other device in communication with the mobile scanner 20.

The control unit 22 may also be electrically coupled via a connection 27 to a sensor such as a reader 28 configured to detect and/or read information on an identifying label or indicator 92 located on the packaging of a retail item 90 when the mobile scanner 20 is placed in direct proximity to the retail item 90. The reader 28 may be a radio frequency identification (RFID) reader, an optical reader, a barcode reader, or the like. It will be appreciated that the reader 28 may be incorporated into a physical structure of the hand-held device 20 or may be a stand-alone device in communication with the hand held device 20.

As can be seen in FIG. 1, the mobile scanner 20 may scan an identifying indicator 92 on a product 90 located in a stocking bin 80 at the retail sales facility 12. It will be appreciated that the mobile scanner 20 may likewise be used to scan an identifying indicator 92 on a product 90 that is located on a stocking cart anywhere at the retail sales facility 12, in a sorting area of a stock room of the retail sales facility 12, in a product unloading area of the retail sales facility 12, or any other location where "overstock" products (e.g., overstock from the sales floor, product returns, or new shipments received from deliveries) may be temporarily stored prior to being sorted for placement into storage bins in the stock room or onto shelves on the sales floor. The product identifying indicator 92 may be a label, tag, or the like including a barcode, radio frequency identification (RFID), or the like that permit a user (e.g., stock room associate) to scan the item 90 with the mobile scanner 20 at the retail sales facility 12 by communicating via a communication pathway 94 (e.g., radio waves) with the barcode or RFID 92 of the item 90 to obtain identifying information regarding the scanned item 90.

Figure 2:
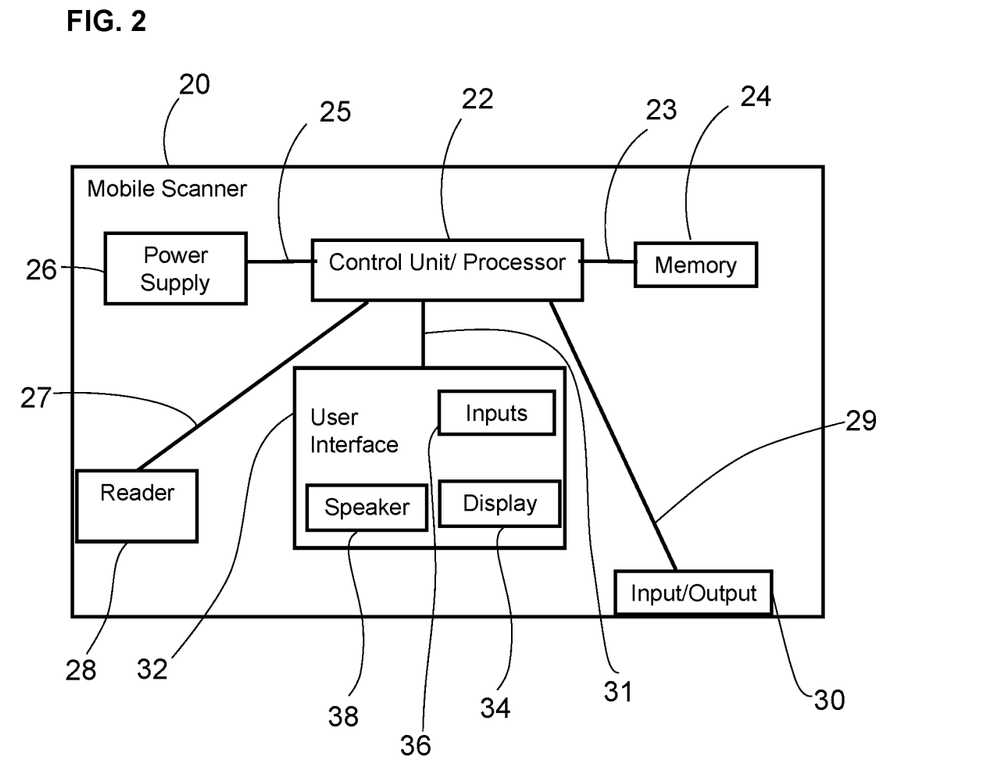
FIG. 2 is a functional diagram of a mobile scanner in accordance with several embodiments.

As shown in FIG. 2, the control unit 22 of the mobile scanner 20 is electrically coupled via a connection 29 to an input/output 30 that can receive signals (e.g., commands, inventory database information) from the local (on-site) server 40 or from any other source, for example, the central station or server 50 located remotely to the retail sales facility 12 that can communicate with the mobile scanner 20, for example, via a wireless connection. The input/output 30 of the mobile scanner 20 can also send signals (e.g., item scan information including information identifying a scanned item) to various devices in communication with the mobile scanner 20, for example, the local server 40, the remote server 50, or any other device in wired or wireless communication with the mobile scanner 20.

In the embodiment shown in FIG. 2, the control unit 22 of the mobile scanner 20 is electrically coupled via a connection 31 to a user interface 32, which may include a visual display or display screen 34 (e.g., LED screen) and/or button input 36 that provide the user interface 32 with the ability to permit a user such as a stock room, binning, or another inventory management associate to manually control the mobile scanner 20 by inputting commands for the mobile scanner 20 to execute, for example, via touch-screen and/or button operation or voice commands. The display screen 34 can also permit the user to see various menus, options, and/or alerts displayed by the mobile scanner 20. The user interface 32 of the mobile scanner 20 may also include a speaker 38 that may provide audible feedback (e.g., alerts) to the user.

Figure 3:
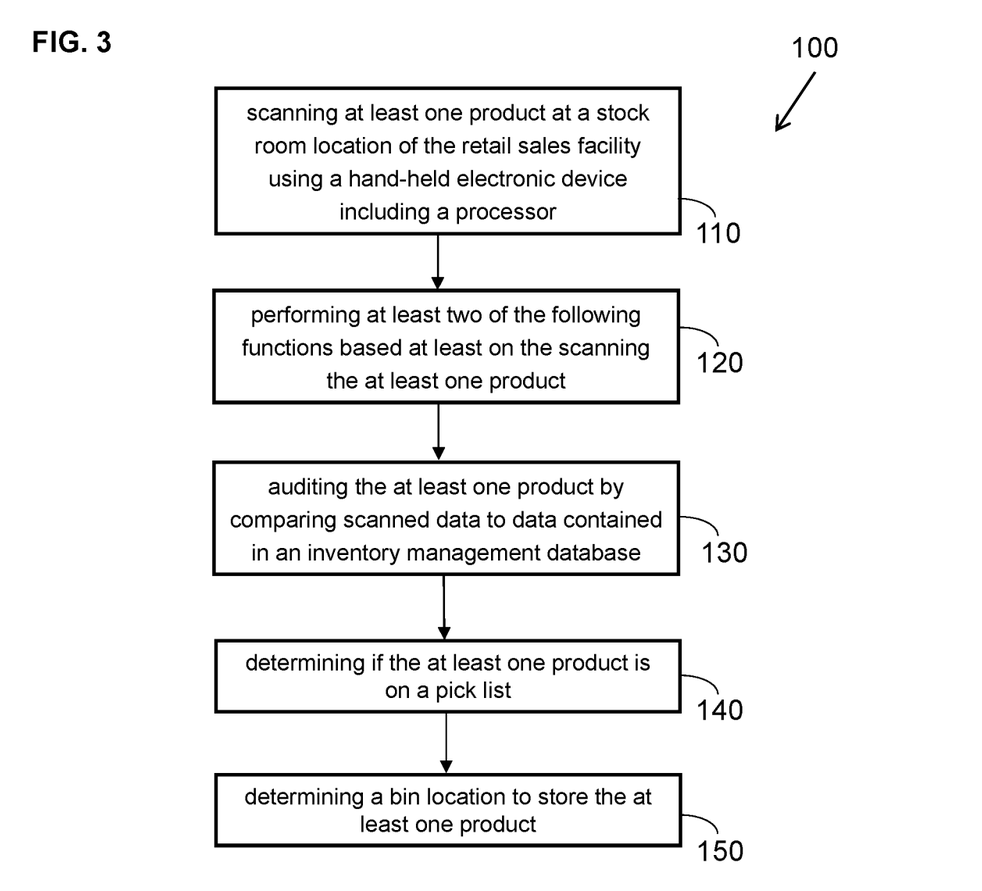
FIG. 3 is a flow chart diagram of a process in accordance with some embodiments.

With reference to FIGS. 1-3, one method 100 of operation of the system 10 to evaluate/manage products 90 at a retail sales facility 12 will now be described. For exemplary purposes, the method is described in the context of the system of FIG. 1, but it is understood that embodiments of the method may be implemented in this or other systems. Generally, as shown in FIG. 3, the method 100 includes scanning at least one product 90 at a stockroom location of the retail sales facility 12 using the hand-held electronic device 20 including a processor (step 110). As depicted in step 120, the method 100 includes performing at least two of the following functions based at least on the scanning of the at least one product 90: (1) auditing the at least one product 90 by comparing data obtained by the scanning of the at least one product 90 to data contained in an inventory management database 42 (step 130); (2) determining if the at least one product 90 is on a pick list (step 140); and (3) determining a bin location to store the at least one product 90 (step 150). These steps are described in more detail below.

In one embodiment, when an item 90 in the stocking bin 80 (located in the stock room or any other location at the retail sales facility 12) is scanned using the mobile scanner 20, the processor of the control unit 22 of the mobile scanner 20 may be programmed to cause the mobile scanner 20 to communicate with the local server 40 by sending an appropriate query or signal via the input/output 30 and through the connection 60 to the local server 40. The signal or query sent from the mobile scanner 20 to the local server 40 may include data representing information that identifies the scanned item 90 and obtained by scanning the identifying indicator 92 of the item 90 via the reader 28 of the mobile scanner 20. In response, the local server 40 may send, via a connection 60, a signal to the mobile scanner 20 including information related to a demand for the scanned item 90. The information regarding the demand for the scanned item 90 may be stored in an inventory management database 42 on the local server 40, in a central database 52 on the central server 50, or on any other server or device configured for communication with the mobile scanner 20.

Generally, the inventory management database 42 may include data related to demand for the item 90 such as the total units sold of the item 90 at the retail sales facility 12 on any given day or per hour, for example. In one embodiment, the inventory management database 42 is configured to keep a running demand for the items 90 at the retail sales facility 12 since delivery of the products 90 to the retail sales facility 12 or a time when a decision is made that the items 90 represent "overstock" until a time when the product 90 is scanned. For example, when a stocking associate scans an item 90 in a stocking bin 80 using the mobile scanner 20, the reader 28 of the mobile scanner 20 reads the identifying indicator 92 of the item 90 and identifies the scanned item 90 based on logic programmed within the mobile scanner 20 (or based on a communication with the local server 40 for access to information in the inventory management database 42). Upon identification of the scanned item 90, the processor of the control unit 22 of the mobile scanner 20 can determine space availability for that item 90 on a shelf 82 on the sales floor at the retail sales facility 12 by analyzing and/or calculating a demand for the product 90 at the retail sales facility 12 within a predetermined time interval. For example, the processor of the control unit 22 of the mobile scanner 20 can be programmed to determine whether space is presently available for the scanned item 90 on a shelf 82 on the sales floor by analyzing and/or calculating a consumer demand (e.g., units sold) for the item 90 from a time when the item 90 was delivered to the retail sales facility 12 (e.g., on a preceding day or the present day) and/or from a predetermined time of day when the item 90 was designated as being "overstock" (e.g., after delivery of the item to the retail sales facility 12 and prior to closing of the retail sales facility 12 on the preceding day) to a time of the scanning of the item 90 via the mobile scanner 20. Systems and methods relating to determining a consumer demand for scanned items and stocking decisions for the scanned items based on such determinations are described in more detail in related application entitled "CONSUMER-DEMAND BASED INVENTORY MANAGEMENT SYSTEM," Ser. No. 62/147,221, filed on Apr. 14, 2015, incorporated by reference herein in its entirety.

In response to a determination by the processor of the control unit 22 that space for the scanned item 90 is presently available on the shelf 82 on the sales floor of the retail sales facility 12, the processor of the control unit 22 may be programmed to send a signal to the speaker 38 of the mobile scanner 20 to cause the speaker 38 to generate an audible alert to inform the user (e.g., stock room associate) that space is available on a shelf 82 on the sales floor (or that items identical to the scanned item 90 are already stored in stock room bins). It will be appreciated that instead of an audible alert such as a "beep" (or spoken words such as "Pick" or "In Another Bin" or the like) via the speaker 38, the processor of the control unit 22 may be programmed to send a signal to the visual display 34 of the mobile scanner 20 to cause the visual display 34 to visually indicate to the user that space on a shelf 82 on the sales floor of the retail sales facility 12 is presently available for the scanned product 90. Such an audible or visual alert to the stocking associate regarding available space on the shelf 82 on the sales floor would indicate to the associate that the scanned item 90 is to be taken out (i.e., "picked") from the stocking bin 80 and placed on the shelf 82 on the sales floor of the retail sales facility 12 instead of being placed in a storage bin in the stock room at the retail sales facility 12.

In one embodiment, when a mobile scanner 20 generates a visual (e.g., via the display 34) or audible (e.g., via the speaker 38) alert to the stocking associate to inform the associate that the item 90 may be stocked on the shelf 82 on the sales floor instead of the stock room, the mobile scanner 20 presents the associate with an option to acknowledge the alert, for example, by pressing on the display screen 34 or on one of the inputs 36 of the mobile scanner 20. When the stocking associate acknowledges the audible or visual alert, the processor of the control unit 22 of the mobile scanner 20 is programmed to designate the scanned product 90 as being "picked," i.e., removed from being listed as located in the stocking bin 80 of the retail sales facility 12. In such a case, the processor of the control unit 22 may be programmed to send a signal via the input/output 30 of the mobile scanner 20 to the local server 40 to indicate that the scanned item 90 as being "picked" from the stocking bin 80 such that the inventory management database 42 (which, as discussed above, may be stored on the local server 40 or on the central server 50) may be updated accordingly.

In other words, if upon scanning an item 90 in the stocking bin 80 by the mobile scanner 20, the processor of the control unit 22 of the mobile scanner 20 determines that the shelf 82 on the sales floor of the retail sales facility 12 presently has available space for the scanned product 90, the control unit 22 can send a signal to the inventory management database 42 to remove the scanned item 90 from being listed as being located in the bin 80 and to indicate that the scanned item 90 is to be placed on a "pick" cart that goes to the sales floor of the retail sales facility 12 where an associate can place the scanned item 90 onto the sales floor shelf 82.

The inventory management database 42 may receive signals and data from the mobile scanner 20 and/or the central server 50 and may store and update information regarding, for example, the total inventory of units of the item 90 at the retail sales facility 12, total number of units of the item 90 in storage bins and/or stocking bins 80 in the stock room, and/or the shelf 82 on the sales floor, and/or any other location at the retail sales facility 12. As such, the scanning of an item 90 in a stocking bin 80 by the mobile scanner 20 and the associated update of the inventory management database 42 regarding the location of the item 90 effectively provides an audit of the items 90 located in the stocking bin 80 such that an associate scanning the item 90 in the future would know whether the item 90 is located in its proper location or misplaced.

In one embodiment, the processor of the control unit 22 of the mobile scanner 20 may be programmed to create a log entry in response to a generation of each alert to the inventory management associate, and store this log entry in the memory 24 of the mobile scanner 20. Alternatively, the processor of the control unit 22 may be programmed to cause the input/output 30 of the mobile scanner 20 to send a signal including such log entry information to the local server 40 and/or the central server 50 for storage. If the inventory management associate does not acknowledge the alert generated by the mobile scanner 20, or does not pick the scanned item 90 from the stocking bin 80 and does not enter information into the system 10 (via the mobile scanner 20) indicating that the scanned item 90 is picked from the stocking bin 80, the processor of the control unit 22 of the mobile scanner 20 is programmed to log the associate's lack of acknowledgment or failure to pick the item from the stocking bin 80, thereby generating log data indicating that the inventory management associate did not properly respond to the alert. Systems and methods relating to logging an inventory management associate's actions in response to the alert, creating reports and metrics for monitoring quality of stocking by associates at the retail sales facility 12, adjusting demand for the scanned item 90 in real-time based on the associate's response (or lack of response) to the alert, and updating the inventory management database 42 to reflect the location of the scanned item 90 based on the associate's response (or lack of response) to the alert are described in more detail in related application "CONSUMER-DEMAND BASED INVENTORY MANAGEMENT SYSTEM," Ser. No. 62/147,221, filed on Apr. 14, 2015, incorporated by reference herein in its entirety.

In one approach, if in response to a scan of an item 90 in the stocking bin 80 by an inventory management associate using the mobile scanner 20, the processor of the control unit 22 of the mobile scanner 20 determines (or receives a signal) that no shelf space on the sales floor of the retail sales facility 12 is presently available for the scanned item 90, the mobile scanner 20 may obtain information regarding specific locations (e.g., bins) in the stock room where such items 90 may be already stored. For example, upon a determination (at the mobile scanner 20, local server 40, or the central server 50) that no space for the scanned item 90 is presently available on the shelf 82 at the retail sales facility 12, the processor of the control unit 22 can be programmed to send a signal via the input/output 30 of the mobile scanner 20 to the local server 40 (or to the central server 50) and in response, receive information (e.g., from the inventory management database 42) indicating whether at least one item 90 identical to the scanned item 90 is stored in a storage bin of the stock room at the retail sales facility 12.

More specifically, upon receiving information regarding the location (i.e., identification of the specific bin) of the item 90 in the stock room of the retail sales facility 12 from the local server 40 (or the central server 50), the display 34 of the mobile scanner 20 may visually display the stock room location of the storage bin (e.g., the number of the storage bin or the letter and/or number of the shelf where the storage bin is located) where one or more products that are identical to the scanned product 90 are located. This advantageously permits the stocking associate to group identical items 90 in the same storage bin in the stock room instead of storing identical items 90 in different bins all over the stock room. Such grouping of identical items in the same bins improves the efficiency of subsequent retrieval of the items 90 from the stock room, since an inventory management associate does not have to go to multiple bins to retrieve identical items, but is provided with an opportunity to retrieve all of the necessary items 90 from one bin.

Figure 4:
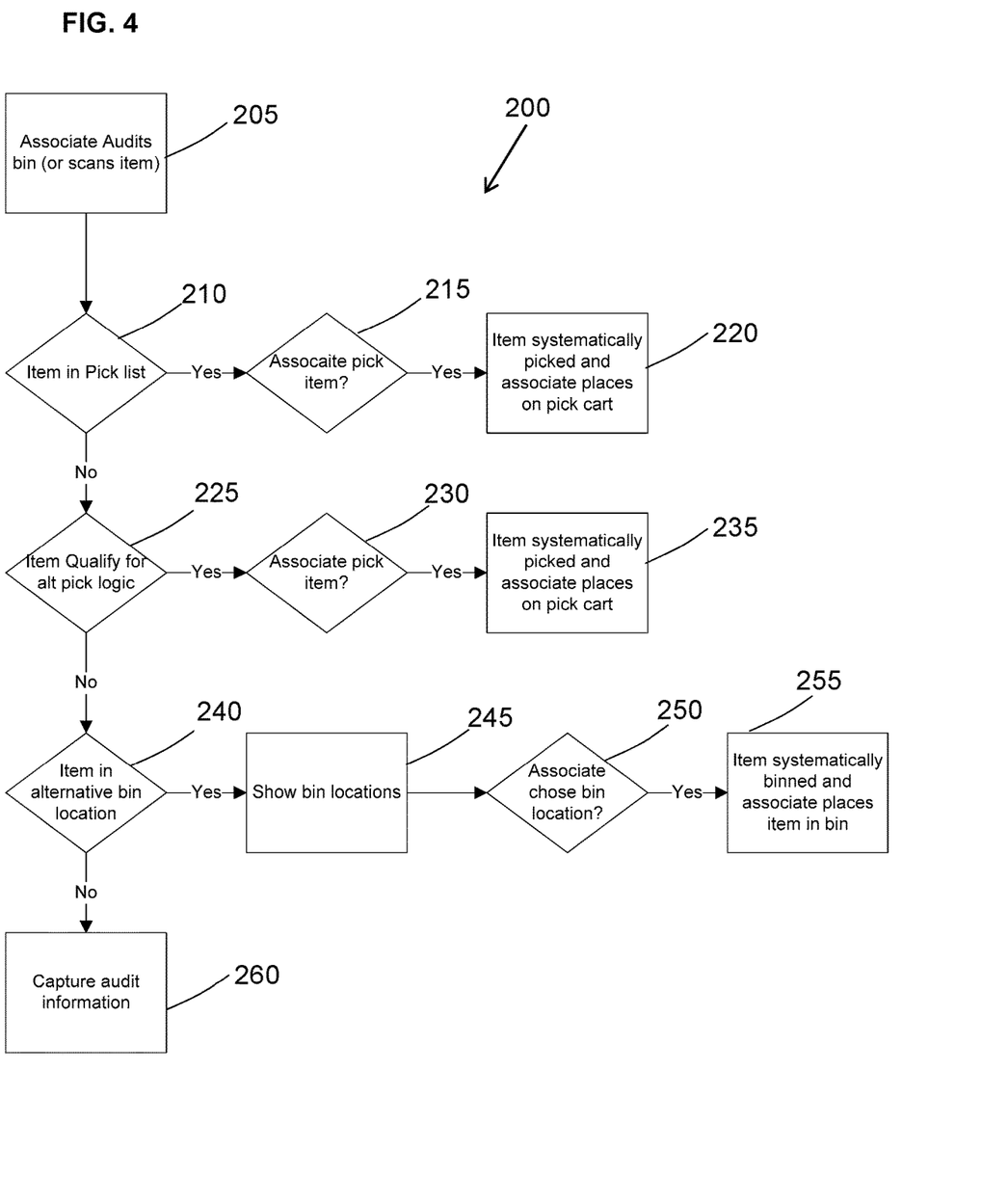
FIG. 4 is a flow chart diagram of a method of managing products at a retail sales facility in accordance with several embodiments.

An exemplary method 200 of managing and stocking of products at the retail sales facility 12 will now be described with reference to FIGS. 1 and 4. When a stocking associate audits a location that may include items 90 to be binned such as a stocking bin 80, a stocking cart, or another location containing overstock items 90 (e.g., by scanning an item 90 using the mobile scanner 20) as shown in step 205, the mobile scanner 20 can be configured to send a signal (e.g., a query) to the local server 40 (e.g., the inventory management database 42) and inform the associate whether the scanned item 90 is on a pick list (step 210). Upon a determination by the system 10 that the scanned item 90 is on a pick list, the mobile scanner 20 displays this information to the associate and the associate may then pick the scanned item 90 from the stocking bin 80 (step 215). As the associate picks the scanned item 90 from the stocking bin 80, the associate may input information (e.g., via the display 34 or the inputs 36) into the mobile scanner 20 indicating that the item 90 was picked from the stocking bin 80 and placed on a pick cart (for delivery to the shelf 82 on the sales floor), and the inventory management database 42 is updated to indicate that the item has been picked from the stocking bin 80 (step 220).

If the item is not on a pick list, the system 10 can run logic to analyze whether space is available for the scanned item 90 on the shelf 82 on the sales floor, and determine whether the scanned item 90 should be picked from the stocking bin 80 and placed into a storage bin in the stock room or on a pick cart for delivery to the sales floor (step 225). If a determination is made by the system 10 that space is available for the scanned item 90 on the shelf 82 on the sales floor, then the associate may pick the scanned item 90 from the stocking bin 80 (step 230) and input information into the mobile scanner 20 indicating that the item 90 has been picked from the stocking bin 80 and placed on a pick cart (for delivery to the shelf 82 on the sales floor). The inventory management database 42 may then be updated to indicate that the item has been picked (step 235). Conversely, if a determination is made that space is not available for the scanned item 90 on the shelf 82 on the sales floor, then the system 10 may inform the associate that the scanned item 90 is already stored in a bin in the stock room and the mobile scanner 20 can display to the associate that items identical to the scanned item 90 are present in a storage bin in the stock room (step 240).

If the mobile scanner 20 informs the associate that items identical to the scanned item 90 are already present in one or more storage bins in the stock room, the mobile scanner 20 can then display the locations of such storage bins in the stock room to the associate (step 245). The associate may then pick the scanned item 90 from the stocking bin 80, place the scanned item 90 into the indicated bin location (or place the scanned item 90 into a consolidation bin for later placement into the indicated bin location) (step 250), and input information into the mobile scanner 20 indicating that the item 90 has been picked from the stocking bin 80 and placed into that bin location, and the inventory management database 42 is updated to indicate that the scanned item 90 has been binned and the location of the bin (step 255).

If the mobile scanner 20 informs the associate that items identical to the scanned item 90 are not present in any of the storage bins in the stock room, the associate may then pick the scanned item 90 from the stocking cart 80, place the scanned item 90 into a storage bin in the stock room, and input information into the mobile scanner 20 indicating that the item 90 has been picked from the stocking bin 80 and placed into a storage bin location (and indicate the location of the bin), and the inventory management database 42 is updated to indicate that the scanned item 90 has been binned and where (step 260), effectively completing the bin audit process.

As described herein, the system and methods described herein provide for easy and efficient management of inventory at a retail sales facility by enabling an associate to simultaneously perform at least two different functions in one embodiment, and three different functions in another embodiment, that previously required at least three different associates to accomplish. As discussed above, in a response to a scan of an item in a stocking bin, the system may calculate and/or analyze the consumer demand for the item on the sales floor at the retail sales facility in a predetermined time interval to advantageously determine whether the scanned item can fit on a shelf on the sales floor. The system's determination that the item can fit on the shelf on the sales floor can generate a visible or audible signal for the associate to pick the item from the stocking bin and transfer the item to the shelf on the sales floor. This improves stocking efficiency by avoiding situations where the associate stocks the item in a storage bin in the back room while the shelf on the sales floor has empty spaces where this item can be placed. As such, items delivered to a retail sales facility are not indiscriminately stored in a storage bin in a stock room while the shelves on the sales floor where such items are displayed may have empty spaces.

The determination that the item fits on the shelf on the sales floor may be advantageously used to adjust the demand for the item at the retail sales facility in real-time and provides for effective auditing of the items at the retail sales facility. The system also advantageously records information indicating whether the associate acknowledged the alert to pick the item from the stocking bin and stock the item on the shelf on the sales floor instead of storing the item in a bin in the stock room, which allows the system to monitor the quality of stocking work by the associates. In addition, the system provides associates with information regarding location of items in bins in the stock room and enables the associate to efficiently organize the items in storage bins in the stock room such that identical items are grouped together in same storage bins and the inventory management associates can retrieve identical items from one bin or adjacent bins instead of having to retrieve identical items from multiple storage bins at random locations in the stock room.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of managing products at a retail sales facility, the method comprising:
   scanning at least one product at a stock room location of the retail sales facility using a hand-held electronic scanner including a processor;
   providing a computing device at the retail sales facility in two-way communication with the hand-held electronic scanner;
   providing an inventory management database in two-way communication with the computing device, the inventory management database configured to store electronic data representing consumer demand for the products within a predetermined time interval at the retail sales facility and electronic data representing total shelf space for the products at the retail sales facility;
   in response to the scanning of the at least one product, transmitting a signal from the hand-held electronic scanner to the computing device, the signal including an identifier of the at least one product scanned by the hand-held electronic scanner;
   in response to receiving the signal from the hand-held electronic scanner, transmitting a query from the computing device to the inventory management database to obtain, from the inventory management database, the electronic data representing the consumer demand for the at least one scanned product and the electronic data representing shelf space allocated at the retail sales facility for the at least one scanned product;
   after obtaining the electronic data from the inventory management database, transmitting the electronic data obtained from the inventory management database from the computing device to the hand-held electronic scanner;
   analyzing, via the processor of the hand-held electronic scanner, the electronic data received from the computing device and, based on the analyzing of the consumer demand for the at least one scanned product and the electronic data representing shelf space allocated at the retail sales facility for the at least one scanned product:
   determining, via the hand-held electronic scanner, whether to generate an alert on the hand-held electronic scanner indicating that the at least one scanned product is on a pick list; and
   determining, via the hand-held electronic scanner, whether to generate an alert on the hand-held electronic scanner indicating a storage bin in the stock room location of the retail sales facility in which the at least one scanned product is to be stored;
   wherein the determining whether to generate the alert further comprises:
   identifying at least one storage bin in the stock room location of the retail sales facility that stores at least one product identical to the scanned product; and
   identifying, in the alert, the storage bin in the stock room location of the retail sales facility that stores at least one product identical to the scanned product and in which the at least one scanned product is to be stored.

2. The method of claim 1, wherein the scanning of the at least one product at the stock room location includes one of scanning that at least one product at the stock room location using at least one of a radio frequency identification (RFID) reader, an optical reader, and a barcode reader.

3. The method of claim 1, wherein the scanning of the at least one product at the stock room location further comprises scanning the at least one product in a stocking bin at the stock room location of the retail sales facility and auditing the stocking bin containing the scanned at least one product.

4. The method of claim 1, wherein the determining if the at least one product is on the pick list further comprises determining availability of shelf space on a sales floor at the retail sales facility by calculating a demand for the at least one product from a time of delivery of the at least one product on an immediately preceding day to a time of the scanning.

5. The method of claim 4, wherein the determining if the at least one product is on the pick list further comprises calculating a total number of sales of the at least one product since delivery on an immediately preceding day.

6. The method of claim 4, wherein the determining if the at least one product is on the pick list further comprising causing the hand-held electronic device to produce one of an audible alert and a visual display in response to a determination that shelf space on the sales floor of the retail sales facility is presently available for the scanned product.

7. The method of claim 6, further comprising designating the scanned product for removal from being listed as located in a stocking bin at the retail sales facility in response to an acknowledgement of the audible alert or the visual display by a worker at the retail sales facility.

8. A system for managing products at a retail sales facility, the system comprising:
   an hand-held electronic scanner configured to scan at least one product at the retail sales facility;
   a computing device at the retail sales facility in two-way communication with the hand-held electronic scanner;
   an inventory management database in two-way communication with the computing device, the inventory management database configured to store electronic data representing consumer demand for the products within a predetermined time interval at the retail sales facility and electronic data representing total shelf space for the products at the retail sales facility;
   wherein the hand-held electronic device includes a control unit including a processor programmed to, in response to a scan of the at least one product by the hand-held electronic scanner, to transmit a signal from the hand-held electronic scanner to the computing device, the signal including an identifier of the at least one product scanned by the hand-held electronic scanner;

wherein, in response to receiving the signal from the hand-held electronic scanner, the computing device is configured to transmit a query to the inventory management database to obtain, from the inventory management database, the electronic data representing the consumer demand for the at least one scanned product and the electronic data representing shelf space allocated at the retail sales facility for the at least one scanned product;

wherein, in response to receipt of the electronic data from the inventory management database, the computing device is configured to transmit the electronic data obtained from the inventory management database to the hand-held electronic scanner;

wherein the processor of the electronic hand-held scanner is programmed to analyze the electronic data received from the computing device and, based on analysis of the consumer demand for the at least one scanned product and the electronic data representing shelf space allocated at the retail sales facility for the at least one scanned product, the processor of the hand-held electronic scanner is programmed to:

determine whether to generate an alert on the hand-held electronic scanner that the at least one scanned product is on a pick list;

determine whether to generate an alert on the hand-held electronic scanner indicating a storage bin in the stock room location of the retail sales facility in which the at least one scanned product is to be stored; and if a determination is made by the processor of the hand-held electronic scanner to generate the alert indicating the storage bin in the stock room location of the retail sales facility in which the at least one scanned product is to be stored, to:

identify at least one storage bin in the stock room location of the retail sales facility that stores at least one product identical to the scanned product; and identify the storage bin in the stock room location of the retail sales facility that stores at least one product identical to the scanned product and in which the at least one scanned product is to be stored.

9. The system of claim 8, wherein the reader includes at least one of a radio frequency identification (RFID) reader, an optical reader, and a barcode reader.

10. The system of claim 8, wherein the processor of the control unit is programmed to audit a stocking bin at the stock room location of the retail sales facility containing the at least one product.

11. The system of claim 8, wherein the processor of the control unit is programmed to determine availability of shelf space on a sales floor at the retail sales facility by calculating a demand for the at least one product from a time of delivery of the at least one product on an immediately preceding day to a time of the scan.

12. The system of claim 11, wherein the processor of the control unit is programmed to calculate a total number of sales of the at least one product since delivery on an immediately preceding day.

13. The system of claim 11, wherein the control unit is adapted to cause generation of one of an audible alert and a visual display in response to a determination that shelf space on the sales floor of the retail sales facility is presently available for the scanned at least one product.

14. The system of claim 13, wherein the control unit is configured to designate the scanned at least one product for removal from being listed as being stored in a stocking bin in a stock room location of the retail sales facility in response to an acknowledgement of the audible alert or the visual display by a worker at the retail sales facility.

* * * * *